United States Patent
Lehnert et al.

[11] 3,935,178
[45] Jan. 27, 1976

[54] PROCESS FOR THE RING OPENING POLYMERISATION OF CYCLOOCTADIENE-(1-5)

[75] Inventors: Gunther Lehnert, Leverkusen-Waldsiedlung; Dieter Maertens, Leverkusen; Manfred Zimmermann, Cologne, all of Germany

[73] Assignee: Bayer Aktiengesellschaft, Germany

[22] Filed: June 20, 1974

[21] Appl. No.: 481,312

[30] Foreign Application Priority Data
June 27, 1973 Germany............................ 2332564

[52] U.S. Cl..... 260/88.2 D; 260/33.6 UA; 260/93.1
[51] Int. Cl.²..... C08F 4/06; C08F 4/20; C08F 4/22
[58] Field of Search........ 260/93.1, 88.2 D; 450/640

[56] References Cited
UNITED STATES PATENTS

| | | |
|---|---|---|
| 3,435,016 | 3/1969 | Rinehart............................ 260/93.1 |
| 3,598,796 | 8/1971 | Nützel et al. ...................... 260/88.2 |
| 3,830,877 | 8/1974 | Dall'Asta et al. ................... 260/875 |

*Primary Examiner*—Stanford M. Levin
*Attorney, Agent, or Firm*—Connolly and Hutz

[57] ABSTRACT

A process for the polymerisation of cyclooctadiene-(1,5) wherein cyclooctadiene-(1,5) is polymerised on halides of tungsten, molybdenum, tantalum, or rhenium as catalyst in the presence of bicyclo-[2,2,1]-heptadienes-(1,5) of the general formula (I)

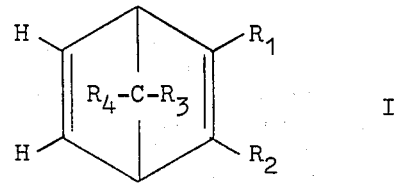

as activator, $R_1$, $R_2$, $R_3$ and $R_4$ denoting independently of each other, a monovalent hydrocarbon radical or hydrogen.

5 Claims, No Drawings

PROCESS FOR THE RING OPENING POLYMERISATION OF CYCLOOCTADIENE-(1-5)

The ring opening polymerisation of cyclooctadiene-(1,5) to form open chain or macrocyclic unsaturated polymers having 1,4-polybutadiene structure is already known. Polymerisation catalysts which have been described for this purpose are combinations of molybdenum and/or tungsten compounds and of organometallic compounds or metal hydrides of Groups I a to IV a of the Periodic System of Elements (Handbook of Chemistry and Physics, 47th Edition, 1966, page B-3, Chemical Rubber Comp., Cleveland, Ohio, USA). Metals of Groups I a to IV a and metal halides of Groups III a can also be used instead of organometallic compounds. In Italian Pat. No. 784,307 it has also been proposed that $WCl_6$ be used without cocatalyst for the ring opening polymerisation of cyclopentene. However, long reaction times are required and only very low yields are obtained.

It has now been found that ring opening polymerisation of cyclooctadiene-(1,5) to produce high molecular weight, unsaturated polymers can be effected rapidly and with high yields on halides of tungsten, molybdenum, tantalum or rhenium as catalyst if the polymerisation system is activated with small quantities of a bicyclo-[2,2,1]-heptadiene-(1,5).

This invention therefore relates to a process for the polymerisation of cyclooctadiene-(1,5) wherein cyclooctadiene-(1,5) is polymerised in the presence of halides of tungsten, molybdenum, tantalum or rhenium as catalyst in the presence of bicyclo-[2,2,1]-heptadienes-(1,5) of the formula (I)

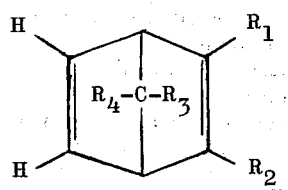

as activator, in which $R_1$, $R_2$, $R_3$ and $R_4$ represent, independently of each other, a monovalent hydrocarbon group, preferably an alkyl group containing 1 to 6 carbon atoms or hydrogen. Norbornadiene is particularly preferred. Bicycloheptadienes are easily obtainable on a large technical scale and are easy and absolutely safe to handle. High polymer yields of up to 70 % are obtained after short reaction times, e.g. 15 minutes. By virtue of these high volume/time yields production facilities are utilised to the best advantage. The polymers obtained are distinguished by their very low ash contents.

The polymerisation according to the invention may be carried out with or without an inert solvent. The usual method of solution polymerisation is preferred. Aliphatic, cycloaliphatic, aromatic and chlorinated hydrocarbons are suitable solvents.

The catalyst is preferably tungsten hexachloride and this again is preferably in dissolved form in order to ensure uniform progress of the polymerisation reaction.

Other tungsten halides may also be used, for example $WCl_5$ or $WF_6$ and also the halides of molybdenum, e.g. $MoCl_5$, of tantalum, e.g. $TaCl_5$ and of rhenium e.g. $ReCl_5$.

The quantity of catalyst used is generally 0.05 to 2 mmol for every 100 g of monomer, preferably 0.15 to 1 mmol. The bicycloheptadiene of formula I is preferably used in quantities of 0.1 to 10 % by weight, based on the monomer, in particular 0.5 to 3 % by weight. It is consumed in the polymerisation and incorporated into the polymer.

Iodine, ether, $BF_3$, $BF_3O(C_2H_5)_2$ may be added as a cocatalyst in a further modification of the process.

Solution polymerisation is preferably carried out in solutions which contain 10 to 30 % by weight of monomer.

Polymerisation proceeds at temperatures of −50 to 60°C. Temperatures of ± 0 to 30°C are preferred for high polymerisation velocities.

When the required degree of monomer conversion has been achieved, polymerisation may be terminated, e.g. by the addition of alcohols, carboxylic acids and/or amines. The stabilizers and age resistors conventionally used for rubbers, e.g. phenyl-$\beta$-napthylamine or 2,6-ditert.-butyl-4-methyl-phenol may be added in quantities of 0.2 to 3 %.

The polymers may be isolated by precipitation with an alcohol, e.g. methanol or ethanol, or by steam distillation.

The isolated polymers are then dried, e.g. in a vacuum drying chamber on a band drier or in a drying screw extruder.

High molecular weight, uncross-linked polybutadienes containing small quantities of copolymerised norbornadiene which has undergone ring opening copolymerisation are obtained. These polybutadienes have a cis double bond content of from 70 to 95 % (determined by IR spectroscopy), depending on polymerisation temperature and polymerisation time.

The polymers obtained are rubber-like compounds. They can be vulcanised with conventional vulcanisation agents and processed in rubber processing gear.

Dry apparatus and reagents are used in the following examples and the reactions are carried out under an inert gas atmosphere, for example nitrogen or argon.

EXAMPLE 1

100 ml of toluene, 30 ml of cis-cyclooctadiene-(1,5) and 0.4 ml of norbornadiene are introduced into a 250 ml glass flask and the mixture is cooled to 0°C. 1.3 ml of a solution of 0.05 mol of $WCl_6$ in 1 liter of toluene is added with vigorous stirring. Polymerisation starts up immediately. The temperature of the reaction mixture is kept between 0°C and 5°C by suitable external cooling. Polymerisation is terminated after 15 minutes by the addition of 2 ml of a solution containing 10 volumes percent of tri-n-butylamine in toluene as solvent. The polymer is precipitated with about 1 liter of ethanol, stabilized with 0.5% by weight of 2,2'-dihydroxy-3,3'-ditert.-butyl-5,5'-dimethyl-diphenylmethane and dried to constant weight in a vacuum drying cupboard at 50°C. 16.6 g of polymer with a cis-double bond content of 77.3% are obtained. No vinyl double bonds can be detected. The NMR spectra show units of the structure.

which have been obtained by the ring opening of norbornadiene.

[$\eta$] in toluene at 25°C = 1.5

EXAMPLE 2

The procedure is the same as in Example 1 but benzene is used instead of toluene and 0.6 ml of norbornadiene is used. After a polymerisation time of 45 minutes at ±0°C, 12.4 g of a polymer which has a cis-double bond content of 76.7% are obtained.

[$\eta$] in toluene at 25°C = 4.5

EXAMPLE 3

Example 2 is repeated but using cyclohexane as solvent. After 2 hours polymerisation at about 0°C, 5.6 g of a polymer with a cis-double bond content of 87.1% are obtained.

[$\eta$] in toluene at 25°C = 2.8

EXAMPLE 4

The procedure is the same as in Example 1 but polymerisation is carried out for 3 hours at 0°C in chlorobenzene, and 0.4 ml of norbornadiene is used. 19.7 g of a polymer with a cis-double bond content of 73.6% are obtained.

[$\eta$] in toluene at 25°C = 1.9

EXAMPLE 5

Example 1 is repeated but polymerisation is carried out for 2 hours at −30°C. 3.4 g of polymer with a cis-double bond content of 91.6% are obtained.

[$\eta$] in toluene at 25°C = 2.5

EXAMPLE 6 (Comparison example)

To demonstrate the activity of norbornadiene, the experiment described in Example 1 is repeated but without the addition of norbornadiene, and polymerisation is continued for 4 hours at 0°C. When at the end of this time ethanol is added to precipitate the reaction product, only a slight cloudiness is obtained and no polymer is isolated.

EXAMPLE 7 (Comparison example)

Example 6 is repeated but using twice the quantity of $WCl_6$. Again, as in Example 6, no polymer is obtained.

EXAMPLE 8

The same procedure as in Example 1 is adopted but only 0.2 ml of norbornadiene is used and 2.6 ml of $WCl_6$ solution. After 2 hours at 0°C, 17.8 g of polymer with a cis-double bond content of 78.6% are obtained.

[$\eta$] in toluene at 25°C = 1.5

We claim:

1. A process for the ring opening polymerization of cyclooctadiene-(1,5), said process comprising polymerizing said diene in the presence of 0.05 to 2 mmols for every 100 g. of said diene, of at least one halide of at least one metal selected from the group consisting of tungsten, molybdenum, tantalum and rhenium and in the presence of 0.1 to 10% by weight, based on the weight of said diene, of an activator of the formula

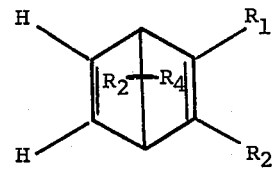

wherein $R_1$, $R_2$, $R_3$ and $R_4$ are the same or different and are selected from the group consisting of hydrogen and monovalent hydrocarbon.

2. The process as claimed in claim 1 in which $R_1$, $R_2$, $R_3$ and $R_4$ are hydrogen or alkyl having 1 to 6 carbon atoms.

3. The process as claimed in claim 1 in which the catalyst is tungsten hexachloride.

4. The process as claimed in claim 1 in which the activator is norbornadiene.

5. The process as claimed in claim 1 in which 0.5 to 3 % by weight of activator is used.

* * * * *